United States Patent [19]

Tortorello et al.

[11] Patent Number: 4,665,146

[45] Date of Patent: May 12, 1987

[54] AMINE-FUNCTIONAL MONOETHYLENIC MONOMERS, ACRYLIC COPOLYMERS AND AQUEOUS COATING COMPOSITIONS CONTAINING THE SAME

[75] Inventors: Anthony J. Tortorello, Elmhurst, Ill.; Joseph D. Lukanich, Green Lake, Wis.

[73] Assignee: DeSoto, Inc., Des Plaines, Ill.

[21] Appl. No.: 865,784

[22] Filed: May 22, 1986

[51] Int. Cl.$^4$ .............................................. C08F 20/58
[52] U.S. Cl. .................................. 526/304; 204/14.1; 560/159; 560/24
[58] Field of Search ................. 560/159, 24; 526/304; 204/14.1

Primary Examiner—Paul R. Michl
Assistant Examiner—Alex H. Walker
Attorney, Agent, or Firm—Dressler, Goldsmith, Shore, Sutker & Milnamow, Ltd.

[57] ABSTRACT

Monoethylenically unsaturated polymerizable monomers carrying a plurality of ketimine-blocked primary amine groups are disclosed. These are preferably provided by reacting an organic diisocyanate with the single secondary amine group of a ketimine-blocked diprimary amine carrying a single secondary amino hydrogen atom and then reacting a monohydric acrylate with the other isocyanate group. These monomers are polymerizable to provide copolymers with other monoethylenically unsaturated monomers, and especially acrylate-functional monomers, in which the amine groups remain blocked. These amine groups become unblocked when the copolymers are dispersed in water to form various types of aqueous coating compositions.

22 Claims, No Drawings

AMINE-FUNCTIONAL MONOETHYLENIC MONOMERS, ACRYLIC COPOLYMERS AND AQUEOUS COATING COMPOSITIONS CONTAINING THE SAME

DESCRIPTION

1. Technical Field

This invention relates to latent primary amine-functional monoethylenic monomers, and especially urethane acrylates, and it includes acrylic copolymers containing these monomers as well as aqueous coating compositions containing these copolymers. Amine-functional copolymers in which the amine functionality is blocked for release in the presence of water have not hitherto been practicably available, and are made available by this invention.

2. Background Art

Monoethylenically unsaturated copolymerizable monomers having primary amine functionality are rare, especially those with acrylic unsaturation. In part this is because the amino hydrogen groups react with acrylic unsaturation in a Michael-type addition reaction which consumes the unsaturation. Even though the methacrylic functionality better resists the Michael-type reaction, the usual amino-functional methacrylates in commerce are tertiary amines.

In this invention the primary amino hydrogen atoms are blocked for release in the presence of water, and thus resist Michael addition prior to polymerization which would prematurely and undesirably eliminate the ethylenic unsaturation, especially if the unsaturation is acrylic. The absence of water also prevents premature reaction with other resins, such as epoxy resins, in organic solvent medium, and this allows one to place the polymers of this invention into coating compositions which are complete except for the introduction of water or solublizing acid, or both.

On the other hand, when these polymers with their blocked primary amine groups are placed in aqueous medium, the primary amine groups become unblocked and reactive. However, in the aqueous medium one can protonate the amine groups with a volatile acid, like acetic acid, and thus maintain much of the stability which is desired prior to use.

As will be evident, once the aqueous coating compositions are deposited upon a substrate and the water and solvent components evaporate, the volatile acid also evaporates. In the absence of the stabilizing acid, the primary amine groups are rapidly reactive, and this allows the cure to proceed either at room temperature, or more rapidly at elevated temperature.

Copolymerizable monoethlenically unsaturated monomers containing a ketimine-blocked primary amine group are known, as described in U.S. Pat. No. 3,497,485 issued Feb. 24, 1970 to W. D. Emmons, and these have been copolymerized with other monomers and used in aqueous medium. However, the known systems have not received commercial acceptance for several reasons.

First, the prior ketimine-functional monoethylenic monomers were made from linear polyethers which are primary amine-terminated at one end and hydroxy-terminated at the other end. These are not very available in commerce, and it is desired to proceed using more readily available reactants.

Second, the prior ketimine-functional monoethylenic monomers could only be made by transesterification, and this is not the easiest reaction, as described in the Emmons patent.

Third, transesterification is not a clean reaction, leaving unreacted ester and disturbing the ketimine block. It will be understood, especially when acrylate unsaturation is present, that momentary unblocking can lead to undesired Michael addition.

Accordingly, another feature of the invention is to avoid the difficult transesterification reaction needed by Emmons, especially by using reactions which are much easier to carry out.

Fourth, the ester structure produced by Emmons is well known to be hydrolytically unstable, and the ketimine-blocked polymers desired herein are used in aqueous medium which is either acidic or basic to provide polymer dispersibility. Thus, the products of this invention are normally used under conditions provoking hydrolytic instability, which is exactly where the Emmons esters are inadequate. It is desired herein to use linkages having greater hydrolytic stability.

Moreover, the Emmons product brings in only one ketimine group for each ethylenically unsaturated group. This is not very economical and it minimizes the cross-link density. The Emmons patent does not hint at how a monoethylenic monomer containing a plurality of ketimine-blocked primary amine groups might be provided.

DISCLOSURE OF INVENTION

In accordance with this invention, a monoethylenically unsaturated polymerizable monomer is provided carrying a plurality of ketimine-blocked primary amine groups. The monoethylenic unsaturation of said monomer is preferably provided by the acrylate or methacrylate group, and most especially the acrylate group, though other unsaturated groups may also be used, such as maleic unsaturation, allylic unsaturation and styryl unsaturation. All the primary amine groups must be ketimine-blocked in this invention, as is illustrated by the preferred reactant, diketimine-blocked diethylene triamine.

Using diethylenetriamine as a prime illustration in this invention, it is blocked by ketimine formation with each of its two primary amine groups in conventional fashion. This provides a monosecondary amine containing two ketimine-blocked primary amine groups. This diketimine with its single amino hydrogen atom is then reacted to introduce a single ethylenically unsaturated group. This can be done by reaction with maleic anydride or methacrylic acid to form a carboxylic acid amide, or it can be done by reaction with an ethylenically unsaturated epoxide, like allyl glycidyl ether or a monoester of acrylic acid with a diglycidyl ether of a bisphenol, or a monoether of hydroxyethyl acrylate with a diglycidyl ether of a bisphenol. In this invention it is found that preferred products are obtained using isocyanate-functional compounds to combine the ketimine-blocked primary amine groups with acrylate or methacrylate unsaturation via the hydrolysis-resistant urethane and urea groups. Both groups form rapidly at moderate temperatures from reactions producing a very clean and highly useful monoethylenic product.

The above reactions are all straightforward and well known.

The urethane-forming reaction is particularly preferred and is illustrated by again using diketimine-blocked diethylene triamine as illustrative. This monosecondary amine is reacted with one molar proportion of an organic diisocyanate which may be either aliphatic or aromatic, but which is preferably of resinous nature because the two isocyanate groups are at the ends of a polyurethane. The result is that one of the two isocyanate groups in the selected diisocyanate is reacted with monosecondary amine containing two ketimine-blocked primary amine groups, and this leaves the other isocyanate free for reaction with a monohydric acrylate or methacrylate, such as 2-hydroxyethyl acrylate.

As a matter of interest, the above reaction sequence is essential using acrylate unsaturation, but with other unsaturation, such as styryl or allyl unsaturation, one can react the unsaturated monoisocyanate directly with the secondary amine.

The product is a monoacrylate or other mono-unsaturated urethane which contains two ketimine-blocked primary amine groups. However, and since the primary amine groups are blocked, the acrylate and/or methacrylate functionality which may be present is protected from being consumed by Michael-type addition reactions.

The above protection of the reactive ethylenic unsaturation applies not only to the monomer as it awaits polymerization, but also to the mixtures of monomers which one might wish to copolymerize and which will contain all sorts of ethylenic unsaturation, usually including the very sensitive acrylate unsaturation. This would be true in radiation-curing compositions where acrylate monomers and oligomers are usually preferred because of their high reactivity in such cures, but also to diverse polymerizations, such as solution polymerizations, where the polymerization is carried out slowly at elevated temperature in the presence of a free-radical polymerization initiator, such as benzoyl peroxide or the like, to provide solvent-soluble copolymers. This latter polymerization is especially preferred to provide soluble copolymers in water-miscible volatile organic solvents which facilitate the subsequent dispersion of such copolymers into water with the aid of a volatile solubilizing acid, illustrated by formic acid, acetic acid, glycolic acid or dimethylol propionic acid.

As a result, the protection of acrylate unsaturation from the amino hydrogen atoms is important regardless of whether the monoethylenically unsaturated ketimine-blocked monomer contains acrylate unsaturation or not.

While one can start with an organic diisocyanate which is then reacted with either of the two monofunctional reactants (the monosecondary amine or the acrylate- or methacrylate-functional monoalcohol), when acrylate groups are not present, special precautions are needed when acrylate monomers are used. To illustrate a more complex reaction sequence in this invention, one can react either reactant with a starting diisocyanate, and then react with some difunctional material, such as a diol like polypropylene glycol having a molecular weight of 400, and then react the reaction product with a diisocyanate which is reacted with the other reactant either before or after its reaction with the diol reaction product. Of course, one should not add the amine reactant when the acrylate group is present.

Many process variations will be evident to those in the art, and the polyurethane monomers with the preferred monosecondary amines are best defined by their structural formula which is as follows:

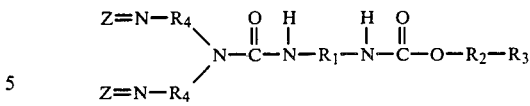

in which:

$R_1$ is a divalent organic aliphatic or aromatic molecule connecting the two isocyanate groups the residues of which are shown;

$R_2$ is $C_2$-$C_4$ alkylene, preferably ethylene;

$R_3$ is a monoethylenically unsaturated carboxylic acid forming an ester with $R_2$;

$R_4$ is $C_2$-$C_4$ alkylene, preferably ethylene; and

Z is the residue of an aliphatic ketone forming a ketimine with the nitrogen atom.

The monomers described above can be copolymerized with other polymerizable monoethylenically unsaturated monomers in any desired fashion, albeit conventional solvent solution copolymerization is preferred. Since the ketimine groups are water-sensitive, the organic solvents used should be water free to prevent premature unblocking of the amine groups. The solvent solution copolymerization is entirely conventional and will not be discussed herein except to point out that the monomers are dissolved in the solvent and the polymer which is formed is preferably also soluble in the solvent and the copolymerization is carried out in the presence of a free-radical polymerization initiator, benzoyl peroxide being typical of the initiators which release free radicals upon being heated to polymerization temperature.

Turning to the monoethylenically unsaturated monomers which are copolymerized in organic solvent solution to provide the soluble copolymers which are primarily contemplated herein, these will include "nonreactive" monomers and may also include reactive monomers unless the primary amine groups employed herein are to be the only ones relied upon. It is usually preferred to include reactive groups such as hydroxy or carboxy groups. The purpose is to provide a polymer containing groups which can be used for cure, either because they are reactive under normal curing conditions with themselves or other groups in the polymer, or because they are reactive under normal curing conditions with reactive groups supplied by an extraneous curing agent such as an aminoplast, phenoplast or blocked polyisocyanate curing agent, all of which are themselves well known.

The term "nonreactive" as applied to a monomer denotes the absence in the monomer of functional groups, other than the single polymerizable unsaturated group, which will react under the contemplated conditions of polymerization and cure. Normally, this means that the single ethylenic group is the only potentially reactive group present. Suitable nonreactive monomers are illustrated by styrene, vinyl toluene, $C_1$-$C_8$ alkyl esters of monoethylenically unsaturated acids, like methyl methacrylate, a butyl acrylate or methacrylate, or 2-ethylhexyl acrylate, vinyl acetate, acrylonitrile, and the like. In the preferred practice of this invention, from 3% to 35%, preferably from 5% to 20% of the copolymer is constituted by the amine-functional monomers of this invention, from 0% to 25% is constituted by an hydroxy-functional monomer like 2-hydroxyethyl acrylate, from 0% to 25% is constituted by a carboxy-functional monomer, like acrylic acid or methacrylic acid, and the balance of the copolymer, usually at least 60% thereof, is constituted by nonreactiave monomers such as styrene and/or vinyl toluene, alkyl acrylate or methacrylate, such as methyl methacrylate, butyl acrylate or 2-ethylhexyl acrylate.

The preferred curing agents used herein, whether within or without the amine polymer, contain the methylol group (which is carried by nitrogen in the aminoplast resins). These cure by a condensation reaction in which alcohol is removed. This reaction is catalyzed by the presence of acid, and the acrylic acid containing copolymers which may be formed herein likely have this function. The carboxyl group is also reactive with the methylol group, and this reaction eliminates any excess acidity which may be included in the amine polymer.

The curing agents are desirably methylol functional, such as aminoplast resins or phenoplast resins, but blocked polyisocyanates are also useful, and all of these are well known for the cure of aqueous coatings, including electrocoatings.

The aminoplast resins which may be used herein are illustrated by hexamethylol melamine, but partially ethylated or partially butylated derivatives thereof are also useful. Urea-formaldehyde and benzoquanamine-formaldehyde resins are also useful in a water dispersible form, this usually being attainable by forming methoxy ethers with the reactive methylol group.

The phenolic resins which may be used as curing agents herein may be water soluble, but they are more desirably solvent soluble materials which disperse in acidic resin aqueous dispersions, such as those disclosed in Sekmakas and Plaisance U.S. Pat. No. 4,447,982. Suitable aminoplast resins and bisphenol-formaldehyde resins which may be used are disclosed in Sekmakas and Shah U.S. Pat. No. 4,265,795 issued May 5, 1981. Appropriate bisphenol-formaldehyde resins are further illustrated in Edward J. Murphy U.S. Pat. No. 4,278,579 issued July 14, 1981. Production of the bisphenol-formaldehyde ethers which are preferred is further illustrated in U.S. Pat. No. 4,310,653 issued Jan. 12, 1982 to John J. Krajewski and Murphy.

When an N-methylol functional monomer, such as acrylamide or methacrylamide which can be methylolated either before of after copolymerization, is included within the amine-functional polymer, it is desirably used in an amount of from 5% to 40% of the copolymer, preferably from 20% to 35%, and even when it is used, an external curing agent may still be used, albeit in smaller amount than if the N-methylol functional monomer were not included within the amine-functional polymer.

The blocked polyisocyanate resins are well known for curing amine-functional resins, and are illustrated by 2-ethylhexanol-blocked toluene diisocyanate or isophorone diisocyanate. These will disperse in the aqueous medium for codeposit with the amine polymers and unblock when the coatings are baked.

As will be appreciated, the aminoplast, phenoplast and blocked polyisocyanate resins are all stable in the aqueous medium even though the presence of water has served to unblock the primary amine groups in the polymer. The deposited coatings are then baked to cure the same in conventional fashion, the baking temperature being a function of the cure selected, the catalysts used and the temperature at which the polyisocyanate unblocks.

However, one can also use a polyepoxide for cure, and now the mixture of polyepoxide and unblocked amine polymer in the aqueous medium is unstable. The stability is reasonably good because of the presence of acid, such as acetic acid, to help disperse the amine polymer because the acid functions to protonate the amine groups, thus making them less reactive in the aqueous medium. However, and when the water, solvent and volatile acid evaporate, the amine functionality becomes highly reactive and the cure can take place in a practical period of time at room temperature, or it can be speeded with moderate heat.

While ketimine-blocked diethylene triamine has been used and is preferred because it provides a blocked ketimine which is a monosecondary amine, one can also use ketimine-blocked triethylene tetramine which forms a diketimine containing two secondary amine groups. This can be reacted with two molar proportions of a diepoxide or a diisocyanate, to provide a diepoxide or diisocyanate-terminated intermediate. One of these terminal epoxide or isocyanate groups can then be terminated with acrylate unsaturation as taught herein, and the other one can be left unreacted or blocked with a volatile alcohol or reacted away in any desired fashion.

When the second isocyanate group is reacted with a volatile blocking agent, such as a lower alcohol, like isopropanol, butanol or 2-ethyl hexanol, the monomer now contains both blocked primary amine groups and blocked isocyanate groups. When such a monomer is polymerized, it provides both of these groups in a solvent-soluble copolymer. When that copolymer is now dispersed in water as taught herein, it will acquire primary amine groups, but the isocyanate group remains blocked until the coating is baked to remove the blocking groups, e.g., the alcohol. At that time the cure will be very rapid because primary amine groups and isocyanate groups are highly reactive.

The preferred acids for solubilizing the amine polymers are volatile organic acids, such as formic acid, acetic acid, glycolic acid, and dimethylol propionic acid. Carbonic acid is also useful. Inorganic acids which do not damage the deposited film, like phosphoric acid, may also be used. Acids which vaporize or decompose are particularly contemplated.

The solubilizing acids may be present during polymerization, as taught in U.S. Pat. No. 4,195,147, or added later.

The partially or fully neutralized amine polymers are dispersed in water, together with a curing agent if needed, and enough water is used to provide aqueous dispersions at appropriate solids content for conventional coating applications (spray, direct or reverse roll coating) or at lower solids for electrocoating (from 3% to 20%, more preferably from 5% to 15%). The water miscible volatile organic solvent used in the polymerization is retained and the presence of the solvent helps to provide the stable dispersions needed for durable aqueous coatings, especially for electrocoating.

When carboxylic acid is present in the copolymer, then the product is amphoteric and may also be dispersed in water with a volatile base, such as ammonia or an amine like dimethyl ethanol amine. This provides anionic polymers in the aqueous medium and these can be electrodeposited upon the anode.

In conventional electrocoating practice, grounded conductive objects are immersed in the electrocoating bath and a unidirectional electrical current is passed through the bath and through the grounded object as cathode or anode to cause the polymers, curing agent and any pigment dispersed in the bath to be electrodeposited upon the cathode or anode.

The voltages used for electrodeposition, the washing procedures employed to rinse off the bath material which remains on the electrocoated object (which is usually ferrous metal) and the baking conditions generally applicable to the various amine polymer systems in use, are all known in the art and are illustrated in the example of preferred practice herein.

All proportions herein and in the accompanying claims are by weight, unless otherwise specified.

The invention is illustrated in the Examples which follow:

EXAMPLE 1

154.00 grams of polypropylene glycol having a number average molecular weight of 1000, 20.16 grams of diethylene glycol, 40.00 grams of polyethylene glycol having a number average molecular weight of 4000 and 71.39 grams of methyl ethyl ketone (water-free urethane grade products is always used in these examples) are mixed in a 1 liter flask equipped with nitrogen purge, overhead stirrer and reflux condenser including a drying tube. This mixture in the flask is then heated to 75° C.

0.10 grams of dibutyltin dilaurate is then added to the hot mixture followed by the dropwise addition over a period of 1 hour of a solution of 140.37 grams of isophorone diisocyanate and 46.79 grams of methyl ethyl ketone. The reaction is continued until a final NCO value of 5.76 is obtained and the mixture is then cooled to 30° C. to provide an isocyanate-terminated polyurethane.

A solution of 59.32 grams of a methyl ethyl ketone-blocked diethylene triamine in 19.77 grams of methyl ethyl ketone is then added dropwise over 15 minutes. The resulting mixture containing the urea formed by reacting the ketone-blocked diethylene triamine with the isocyanate-terminated polyurethane is then heated to 50° C. whereupon 28.21 grams of 2-hydroxyethyl acrylate and 9.40 grams of methyl ethyl ketone are slowly added over a 10 minute period to form a urothane with the remaining isocyanate functionality. The reaction mixture is held at 50° C. until no free isocyanate is detectable by infrared analysis. Then the solution is diluted to 60% nonvolatile solids content by the addition of 147.25 grams of isopropanol.

The methyl ethyl ketone-blocked diethylene triamine referred to above can be made by weighing into a 5000 ml. 4-neck flask 1,000 grams of benzene, 600 grams of methyl ethyl ketone, 412.68 grams of diethylene triamine, and 20.0 grams of Dowex 50W-X12 ion exchange resin. The flask is fitted with a mechanical stirrer, thermometer, Dean-Stark trap, and reflux condenser. The solution is then stirred and heated to reflux. Water is continuously collected and separated in the trap until it can no longer be collected. About 111 grams of water is collected, and the solution is then filtered and the solvent removed by flash evaporation using a rotary evaporator under reduced pressure. The remaining liquid is slightly yellow in color with an amine equivalent weight of 79.7 (compared to the theoretical value of 82).

EXAMPLE 2

An acrylic copolymer is provided by copolymerizing a mixture of 400 grams of n-butyl acrylate, 200 grams of 2-ethylhexyl acrylate, 50 grams of acrylic acid, 150 grams of methyl methacrylate and 400 grams of the urethane monomer solution prepared in Example 1 in the presence of 40 grams of t-butyl peroxy pivalate (75% in mineral spirits) [available as Lupersol 11 from Pennwalt Corporation] and 67 grams of isopropanol over 3 hours at 80° C. The copolymer was formed in solution at 70% solids content in a solvent medium mostly constituted by isopropanol.

EXAMPLE 3

A cationic aqueous disperion of the product of Example 2 is obtained by adding 0.51 gram of 88% formic acid to 100 grams of the product of Example 2. Low shear agitation is applied to achieve complete mixing of the components. Then 110 grams of deionized water are slowly added under high shear agitation to obtain a stable white colloidal dispersion at 33% nonvolatile solids content.

EXAMPLE 4

The dispersion of Example 3 is modified by the addition of 25% by weight of total resin solids of hexamethoxy methyl melamine. With this addition, the dispersion is useful as an aqueous thermosetting coating. It can also be diluted to 10% solids content with additional deionized water to provide an aqueous electrocoating bath which electrodeposits upon the cathode of a unidirectional electrical system to provide a coating which resists water washing and which can be baked to cure the same.

EXAMPLE 5

An anionic aqueous disperion of the product of Example 2 is obtained by adding 4.33 grams of dimethyl ethanol amine to 100 grams of the product of Example 2. Low shear agitation is applied to achieve complete mixing of the components. Then 180 grams of deionized water are added slowly under high shear agitation to obtain a stable white colloidal dispersion at 33% nonvolatile solids content.

This dispersion is modified by the addition of 25% by weight of total resin solids of hexamethoxy methyl melamine. With this addition, the dispersion is useful as an aqueous thermosetting coating. It can also be diluted to 10% solids content with additional deionized water to provide an aqueous electrocoating bath which electrodeposits upon the anode of a unidirectional electrical system to provide a coating which resists water washing and which can be baked to cure the same.

EXAMPLE 6

Another monoethylenic monomer in accordance with this invention was prepared as follows.

A 1000 ml. 4-neck flask was equipped with thermometer, mechanical stirrer, reflux condenser, nitrogen inlet, and pressure-equalized dropping funnel. Into the flask was weighed 111.14 grams of isophorone diisocyanate and 200.0 grams of methyl ethyl ketone. The solution was stirred and heated to 30° C. under an atmosphere of dry nitrogen.

To this solution was added 122.1 grams of the methyl ethyl ketone blocked ketimine of diethylene triamine. This ketimine was added dropwise over 30 minutes and a slight exotherm was observed, so cooling was used to keep the temperature below 40° C. After addition of the ketimine, the funnel was rinsed with 10 grams of additional methyl ethyl ketone and the mixture was stirred at 40° C. for 30 minutes.

The solution was then warmed to 50° C. and 0.1 gram of dibutyltin dilaurate and 0.1 gram of hydroquinone methyl ether were added. This was followed by the addition of 58.05 grams of 2-hydroxyethyl acrylate dropwise over 30 minutes at 50° C. After addition was complete, the mixture was diluted with 28.3 grams of methyl ethyl ketone and the temperature was raised to 70° C. The mixture was stirred at 70° C. until there was no NCO absorption in the infrared spectrum, which took about 2.5 hours.

The product of this example can be used in the same way to form a copolymer as in Example 2 and then to provide dispersions and electrocoat baths as in Examples 3, 4 and 5. Corresponding results are obtained.

EXAMPLE 7

Another monoethylenic monomer in accordance with this invention was prepared as follows.

A 1000 ml. 4-neck flask equipped as in Example 6 was employed. Into the flask was weighed 201.27 grams of alpha, alpha-dimethyl-meta-isopropenylbenzyl isocyanate (meta-TMI monomer supplied by American Cyanamid) and 100.0 grams of methyl ethyl ketone. The solution was stirred and heated to 30° C. under an atmosphere of dry nitrogen. To the solution was then added 0.1 gram of dibutyltin dilaurate and 0.1 gram of hydroquinone methyl ether.

After solution was complete, the mixture was treated with 244.11 grams of the methyl ethyl ketone blocked ketimine of diethylene triamine. This ketimine was added dropwise over 30 minutes and a slight exotherm was observed, so cooling was used to keep the temperature below 40° C. After addition of the ketimine, the funnel was rinsed with 11.31 grams of additional methyl ethyl ketone and the mixture was stirred at 35° C. for 45 minutes at which point no NCO absorption was detectable in the infrared spectrum.

The product of this example can be used in the same way to form a copolymer as in Example 2 and then to provide dispersions and electrocoat baths as in Examples 3, 4 and 5. Corresponding results are obtained.

What is claimed is:

1. A copolymer of monoethylenically unsaturated monomers comprising from 3% to 35% copolymerized monomer which is a monoethylenically unsaturated polymerizable monomer carrying a plurality of ketimine-blocked primary amine groups.

2. A copolymer of monoethylenically unsaturated monomers as recited in claim 1 in which the monoethylenic unsaturation of said monomer carrying a plurality of ketimine-blocked primary amine groups is provided by the acrylate or methacrylate group.

3. A copolymer of monoethylenically unsaturated monomers as recited in claim 1 in which said ketimine-blocked primary amine groups are provided by diketimine-blocked diethylene triamine.

4. A copolymer of monoethylenically unsaturated monomers as recited in claim 1 in which said ketimine-blocked primary amine groups are provided by diketimine-blocked dialkylene triamine in which the alkylene groups contain from 2–4 carbon atoms, and said monomer carrying a plurality of ketimine-blocked primary amine groups contains acrylate unsaturation.

5. A copolymer of monoethylenically unsaturated monomers as recited in claim 1 in which said monomer carrying a plurality of ketimine-blocked primary amine groups is a urethane.

6. A copolymer of monethylenically unsaturated monomers comprising from 3% to 35% of copolymerized monomer which is a monoethylenically unsaturated polymerizable monomer carrying blocked primary amine groups and having the formula:

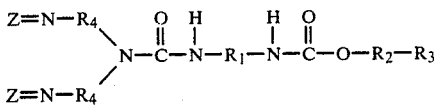

in which:

$R_1$ is a divalent organic aliphatic or aromatic molecule connecting the two isocyanate groups the residues of which are shown;

$R_2$ is $C_2$–$C_4$ alkylene;

$R_3$ is a monoethylenically unsaturated carboxylic acid forming an ester with $R_2$;

$R_4$ is $C_2$–$C_4$ alkylene; and

Z is the residue of an aliphatic ketone forming a ketimine with the nitrogen atom.

7. A copolymer of monoethylenically unsaturated monomers as recited in claim 6 in which $R_2$ is ethylene.

8. A copolymer of monoethylenically unsaturated monomers as recited in claim 6 in which $R_4$ is ethylene.

9. A copolymer of monoethylenically unsaturated monomers as recited in claim 6 in which $R_3$ is acrylic acid or methacrylic acid.

10. A copolymer of monoethylenically unsaturated monomers as recited in claim 8 in which $R_3$ is acrylic acid or methacrylic acid.

11. A copolymer of monoethylenically unsaturated monomers comprising from 3% to 35% of copolymerized monomer as recited in claim 6 in which $R_2$ is ethylene, $R_4$ is ethylene, and $R_3$ is acrylic acid or methacrylic acid.

12. A copolymer as recited in claim 6 comprising from 5% to 20% of copolymerized said monomer carrying blocked primary amine groups.

13. A copolymer as recited in claim 12 comprising acrylate-functional monomer.

14. A copolymer as recited in claim 1 made by solution copolymerization and comprising acrylate-functional monomer.

15. A copolymer as recited in claim 14 in which said copolymerization is carried out in water miscible organic solvent.

16. A copolymer as recited in claim 15 dispersed in water with the aid of a solubilizing acid.

17. An aqueous coating composition comprising the copolymer dispersion of claim 16 including a curing agent for said polymer.

18. A copolymer as recited in claim 15 comprising copolymerized monoethylenically unsaturated carboxylic acid dispersed in water with the aid of a volatile amine.

19. An electrocoating bath comprising the dispersion of claim 16 having a resin solids content in the range of from 3% to 20%.

20. An aqueous coating composition comprising the copolymer dispersion of claim 19 including a curing agent for said polymer.

21. An aqueous coating composition comprising the copolymer dispersion of claim 20 in which said curing agent for said polymer includes blocked isocyanate groups.

22. An electrocoating bath comprising the dispersion of claim 20 having a resin solids content in the range of from 3% to 20%.

* * * * *